United States Patent [19]

Funada et al.

[11] 4,383,738
[45] May 17, 1983

[54] LIQUID CRYSTAL DISPLAY MEANS

[75] Inventors: Fumiaki Funada, Yamatokoriyama; Masataka Matsuura, Tenri, both of Japan

[73] Assignee: Sharp Kabushiki Kaisha, Osaka, Japan

[21] Appl. No.: 266,304

[22] Filed: May 22, 1981

Related U.S. Application Data

[63] Continuation of Ser. No. 21,886, Mar. 19, 1979, abandoned, which is a continuation of Ser. No. 753,709, Dec. 23, 1976, abandoned.

[30] Foreign Application Priority Data

Dec. 25, 1975 [JP] Japan ................................ 50-159335
Aug. 30, 1976 [JP] Japan ................................ 51-103914

[51] Int. Cl.³ ............................................. G02F 1/137
[52] U.S. Cl. .................................................... 350/349
[58] Field of Search ........................ 350/334, 349, 350

[56] References Cited

U.S. PATENT DOCUMENTS

| | | | |
|---|---|---|---|
| 3,551,026 | 12/1970 | Heilmeir ............................... | 350/349 |
| 3,833,287 | 9/1974 | Taylor et al. ........................ | 350/349 |
| 3,975,286 | 8/1976 | Oh .................................... | 350/350 R |
| 4,143,947 | 3/1979 | Aftergut et al. ..................... | 350/334 |

Primary Examiner—John K. Corbin
Assistant Examiner—Paul M. Dzierzynski
Attorney, Agent, or Firm—Birch, Stewart, Kolasch & Birch

[57] ABSTRACT

A liquid crystal display means which employs a mixture of a pleochroic dye and cholesteric or chiral, nematic liquid crystals as a dielectric in a cell whose optical density may be changed by application thereto of an electric field, and in which the mixture contains a substance which makes the characteristic pitch of the liquid crystals such that an improved switching response is achieved, and the molecular structure of the liquid crystals is such that improved contrast is achieved, is disclosed.

4 Claims, 15 Drawing Figures

FIG. 11 dependency of temperature for contrast ratio, $\tau_r$, $\tau_d$ and Vth

LIQUID CRYSTAL DISPLAY MEANS

This application is a continuation, of copending application Ser. No. 021,886, filed on Mar. 19, 1979, which in turn is a continuation of application Ser. No. 753,709, filed on Dec. 23, 1976, both now abandoned.

BACKGROUND OF THE INVENTION

The present invention relates to a colour display means wherein use is made of the so-called guest-host interaction in a mixture of pleochroic dye material and cholesteric or chiral, nematic liquid crystals. More particularly the invention relates to a liquid crystal display means wherein electronic colour switching time is reduced and improved contrast of colour display is achieved.

Pleochroic dye material is dye material which absorbs light of specific wavelengths and displays a characteristic colour when the molecules thereof are aligned parallel to the electric vector of incident polarized light, but which transmits light almost unchanged, whereby the characteristic colour of the dye material disappears, when the long axes of the molecules thereof are perpendicular to the electric vector of incident polarized light. As reported by G. H. Heilmeier and L. A. Zanoni in Appl. Phys. Lett. 13 91 (1968), in some mixtures of pleochroic dye material, constituting the 'guest' material, in nematic liquid crystals, constituting the 'host' material, the molecules of the guest dye material tend to become aligned with the host liquid crystals and application of an electric field can change the orientation of the crystals and hence of the dye molecules. In other words, by successively applying and removing an electric field it is possible to produce changes in the optical density of the mixture and render the mixture alternatively coloured or colourless. Nematic liquid crystals employed may be of the so-called positive type, referred to below as Np material, in which normally, i.e., in the absence of a separately applied electric field, molecules are aligned with the long axes thereof parallel to the electric vector of incident polarized light, or of the so-called negative type, referred to below as Nn material, in which molecules are normally aligned with the long axes thereof perpendicular to the electric vector of incident polarized light.

Figure 1:
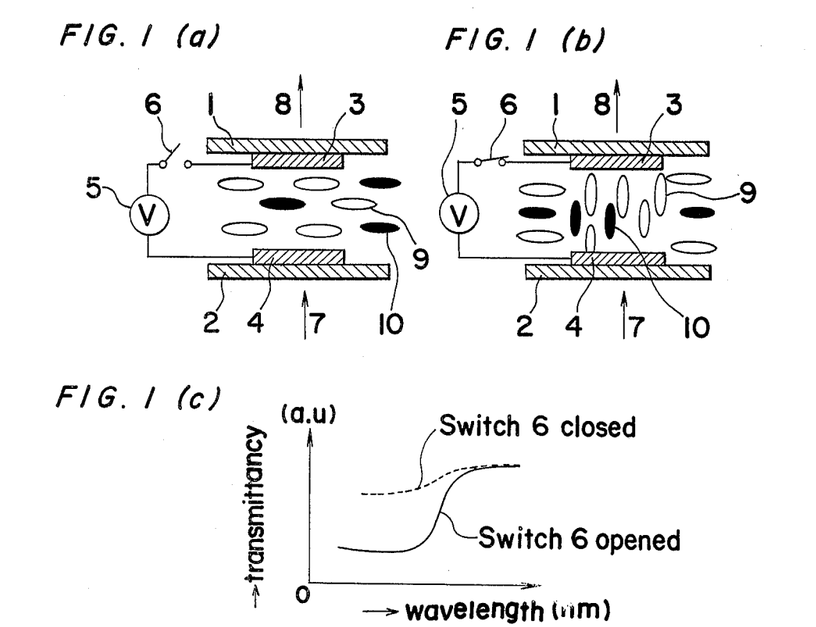
FIGS. 1(a)-1(c) and 2(a)-2(c) are schematic drawings of display cells employing a mixture of pleochroic dye material in nematic liquid crystals such as described above.
Figure 2:
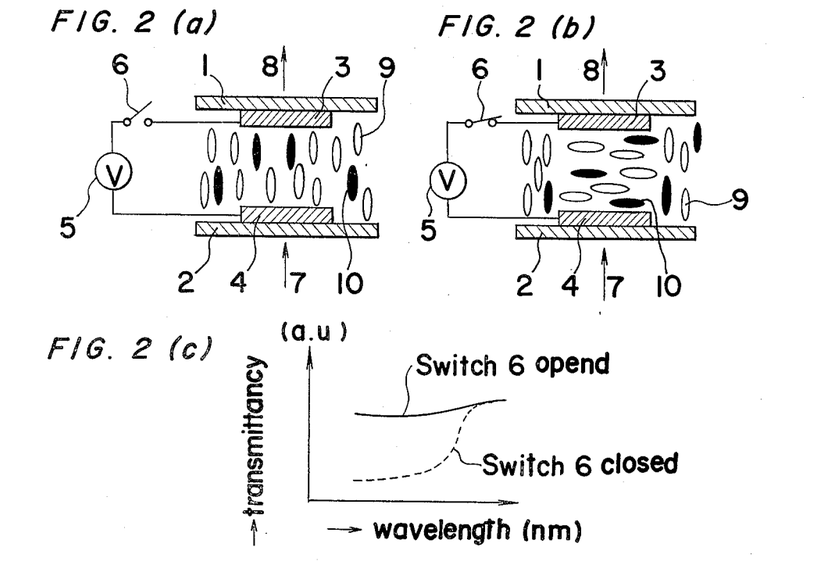

A mixture of a pleochroic dye and nematic liquid crystals may be employed for colour display purposes in a cell such as shown in FIG. 1, which illustrates the case when Np material is employed, or in FIG. 2, which illustrates the case when Nn material is employed. In FIGS. 1 and 2, a mixture of nematic liquid crystal molecules 9 and pleochroic dye molecules 10 constitutes the dielectric in a cell defined by electrodes 3 and 4 which are shaped to define a letter or figure of a required display, or a segment thereof, and which are respectively applied on and supported by support plates 1 and 2. In the example shown, both support plates 1 and 2 and both electrodes 3 and 4 are transparent, and light may be transmitted through the cell, incident light, which impinges on the plate 2 side of the cell, being indicated schematically by the arrow 7 in the drawings, and transmitted light, which emerges from the opposite side of the cell, by the arrow 8. Needless to say, one plate and electrode supported thereby may be opaque, in which case only one electrode need define a required shape, or the required display segment may be defined by an open portion of an opaque support plate on which a transparent electrode is applied. An electric field may be applied on the host molecules 9 and guest molecules 10 which lie between the electrodes 3 and 4 by an AC voltage source 5, which connects directly to the electrode 4 and through a normally open switch 6 to the electrode 3.

In FIG. 1(a), since the nematic liquid crystals employed are Np material, when the switch 6 is unactuated and open, i.e., in the absence of an electric field applied by the voltage source 5, the host molecules 9 and guest molecules 10 are aligned with the long axes thereof generally parallel to the electric vector of incident light 7. Optical density of the cell is therefore comparatively high, as indicated by the solid curve showing transmittancy in FIG. 1(c), and transmitted light 8 is the characteristic colour of the guest dye material. When the switch 6 is closed, as shown in FIG. 1(b), the host molecules 9 and guest molecules 10 between the electrodes 3 and 4 are rotated through approximately 90° about the central groups thereof and so become aligned with the long axes thereof generally perpendicular to the electric vector of incident light 7, with the result that there is a marked increase in transmittancy of the cell, as indicated by the dashed transmittancy curve of FIG. 1(c), and transmitted light 8 is more or less colourless. In FIG. 2, action is analogous when the host nematic liquid crystals employed are Nm material, but the cell is colourless when switch 6 is unactuated and coloured when switch 6 is closed.

Guest-host mixtures have definite possibilities with respect to use thereof in display devices, since the abovedescribed effects are achievable with an electrode spacing of approximately 5 $\mu$m to 15 $\mu$m and an applied electric field of the order of 1 V to 5 V. However, although such display means have good characteristics with respect to dynamic scattering and twisted nematic field effect mode (what is called TNFEM), conventional means have a major defect with respect to switching time, i.e., the minimum time required for effecting the cycle coloured-colourless-coloured in a cell employing Np material or the cycle colourless-coloured-colourless in a cell employing Nn material. It has been found that for Nn material a certain, although still unsatisfactory degree of improvement of switching time can be achieved by increasing applied voltage, there is an upper limit beyond which increase of applied voltage is of no further effect, in addition to which there is of course the disadvantage that power consumption is increased. It is thought that in a cell employing Nn material this phenomenum is due to the fact that electrodes of the cell are comparatively effective in aligning molecules of the guest-host mixture constituting the dielectric, and that for low values of applied voltage therefore there is slower, and also less complete, orientation of molecules of the guest-host mixture with the long axes thereof parallel to the electric vector of incident light. For both Np and Nn material it is possible to improve switching time by employment of a three-terminal drive system for causing forcible return of molecules to an initial orientation. However, this again has the disadvantage of increased power consumption, and also is a practical display means employing a plurality of cells such as shown in FIGS. 1 and 2 use of a three-terminal drive system for each individual cell results in a complicated control circuit for the display means as a whole, with consequent problems of installation and maintenance, as well as increased cost.

Another disadvantage of guest-host mixtures is that, although the mixtures afford contrast which is very little dependent on the angle from which a display is viewed, the absolute value of contrast achieved is low compared with that achievable in other display means.

SUMMARY OF THE INVENTION

It is accordingly a principal object of the present invention to provide an improved display means employing a guest-host mixture of pleochroic dye material in cholesteric or chiral, nematic liquid crystals.

It is another object of the invention to provide a guest-host mixture display means having a reduced switching time.

It is a further object of the invention to provide a guest-host mixture display means in which there is improved contrast of display.

In accomplishing these and other objects, there is provided according to the present invention a display means wherein there is employed a mixture of pleochroic dye material in a host material constituted by nematic liquid crystals which, by doping with suitable material, are rendered chiral nematic material in which the characteristic pitch Po thereof, i.e., the axial length of $2\pi$ spiral rotation of the molecule about the helical axis thereof, is of the order of 0.7 to 10 times the thickness of the layer of a guest-host mixture employed as the dielectric in a display cell, employment of which material affords improved switching time in a display means. Improved contrast of display is achieved by employment of nematic liquid crystals constituted by molecules having an even number of carbon atoms in at least one terminal group thereof.

BRIEF DESCRIPTION OF THE DRAWINGS

A better understanding of the present invention may be had from the following full description thereof when read in reference to the attached drawings, in which.

DETAILED DESCRIPTION

Nematic liquid crystals typically have the formula in which X and Y are terminal groups such as $n-C_mH_{2m+1}O$, $n-C_mH_{2m+1}-$, $n-C_nH_{2n+1}COO-$, $NC-$, or $O_2N-$, a indicating 'normal' and m being an integer which indicates the number of carbon atoms. The central group Z is a group such as $-CH=N-$, $-N=N(O)-$, $-N=N-$, $-COO-$, $-C\equiv C-$, or $-CH=CH-$.

Research conducted by the inventors showed that improved electronic colour switching response of a guest-host display means is achieved if the nematic liquid crystal system constituting the host is a chiral nematic liquid crystal system. Chirality is imparted to nematic liquid crystals having the general formula noted above by adding thereto a dopant in the form of an optically active substance such as cholesteryl nonanoate, cholesteryl myristate, cholesteryl chloride, cholesteryl p-nitro-benzoate, cholesteryl oleyl carbonate, 2-methyl butyl p-N-p' cyanobenzyldene amino cymnamate, 4-amino-4'-secondary butoxy biphenyl 1-menthole, 1-linanole, d-mannitol, d-borneol, d-3-methyl cyclohexanone, d-citronellic acid, or d-tartaric acid, in addition to which they may be employed a compound containing asymmetric carbon.

Figure 3:
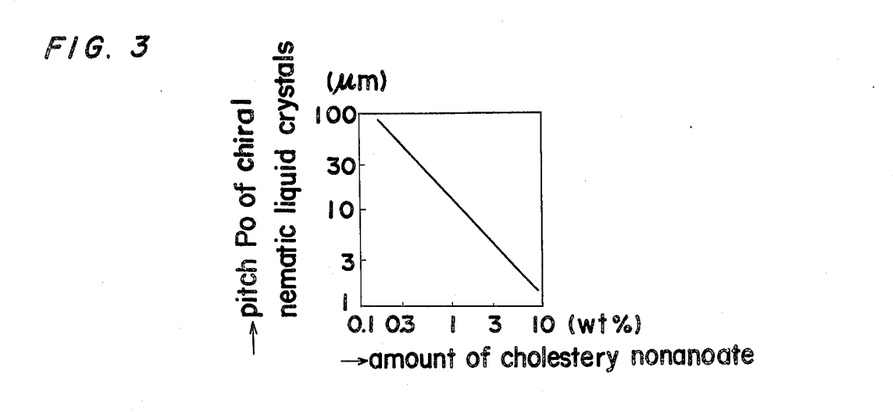
FIG. 3 is a graph showing the relationship between the characteristic pitch Po of molecules of nematic liquid crystals and the amount of addition of cholesteryl nonanoate employed as doping agent.

Non-limiting examples of pleochroic dyes employable in association with a chiral nematic host include indophenol blue, N,N' dimethyl indigo, N,N' dipalmitoyl indigo, methyl red, phenol blue, p nitrobenzylidene phenyl hydrazone, N,N' dimethyl benzylidene, p' cyano aniline, N-p-anisal-4-(4'-cyano phenyl azo)-1-naphthyl amine, butyl orange, and 5-nitro-2-(p-N,N dimethyl phenyl azo) thiazole. In addition there may be advantageously employed the dichroic dyes having the formulas The characteristic pitch Po of chiral nematic material produced by addition of optically active material such as noted above to nematic liquid crystals varies depending on the amount of optically active material added. As shown in FIG. 3, wherein optically active dopant additions are indicated in weight 1, when for example the nematic liquid crystal has four biphenyl compounds, that is, and the optically active substance employed is cholesteryl nonanoate, there is a generally straight-line decrease of characteristic pitch Po of the nematic liquid crystals with increasing addition of the cholesteryl nonanoate. A similar relationship was found to obtain when other nematic liquid crystals and dopants were employed.

Tests were conducted to determine the effect which different values of characteristic pitch Po of the chyral nematic host material achieved by varying additions of dopant have on the switching response of display cells employing guest-host interaction mixtures. Measurements in the tests were made in reference to turn-on time $T_r$, which is defined as the time which elapses from start of application of an electric field on a display cell by closure of the switch 6 shown in FIGS. 1 and 2 to 90% achieval of a set value relating to optical density of the cell, and to turn-off time Td, which is defined as the time which elapses from re-opening of the switch 6 to return to 10% of the set value. For an Np cell such as shown in FIG. 1 the relevant set value indicates percent transmission of light, and for an Nn cell such as shown in FIG. 2 the relevant set value indicates absorption of light. Table 1 shows results of a representative series of tests in which the host material of the display cell was constituted by chiral nematic liquid crystals produced by mixture of the abovenoted biphenyl liquid crystals with varying amounts of cholesteryl nonanoate, and the guest material was constituted by a 0.7% by weight addition of the pleochroic dye material dimethyl red. The thickness of the guest-host dielectric in each cell was 10 μm, the electric field was applied by a 7.0 V, 1 KHz source, and the tests and measurements were conducted in an ambient temperature of 25° C.

TABLE 1

| Po(μm) |  | 120 | 20 | 12 | 8 |
|---|---|---|---|---|---|
| Tr (msec) | 24 | 24 | 28 | 160 | 400 |
| Td (msec) | 200 | 190 | 150 | 120 | 70 | wherein d=10 m, 25° C., 1 KHz, AC 7.0 Vrms $\Delta\psi = 2\pi d/Po$.

From Table 1 it is seen that Td increases in direct proportion, and Tr in inverse proportion to increased Po. Thus, according to the invention different switch-on and switch-off times can be achieved in a display cell employing a guest-host interaction system by varying the characteristic pitch Po of the chiral nematic host. If fast switch-off times are required the characteristic pitch Po is suitably made approximately equal to the thickness of the layer of the guest-host mixture. However, for most display purposes rapid switch-on time also is required, and a suitable range of values of the characteristic pitch Po of the host material is therefore $0.7d \leq Po \leq 10d$, d being the thickness of the layer of the guest-host mixture.

The case considered above was that in which the pleochroic dye constituting the guest material is an optically inactive substance. If, however, the pleochroic dye material is itself optically active, as well as constituting the guest material the dye may simultaneously act as a doping agent for producing chiral nematic liquid crystals, and separate addition of an independent optically active substance is unnecessary.

The reasons for the abovenoted improvement in switch-off time Td are supported to relate to the viscosity $\eta$, thickness d, ad elasticity k of the liquid crystal layer constituting the dielectric in a display cell, it having been determined experimentally that Td is proportional to $\eta \cdot d^2/k$. Since effective elasticity k tends to increase in a chiral nematic system, the switch-off time is correspondingly shortened.

Figure 4:
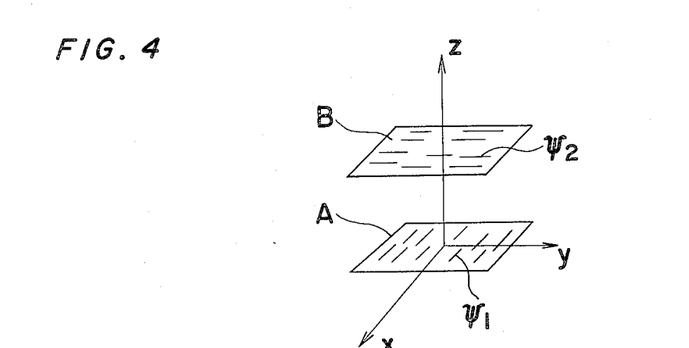
FIG. 4 is a schematic view illustrating factors considered in determining preferred relative orientation of nematic liquid crystal molecules adjacent to opposite plates of a display cell.

Other factors which are important with respect to obtaining uniformity of results and quality of a colour display are the thickness of the guest-host mixture in a display cell and the angle of liquid crystal molecules with respect to the base plates of the cell. The material or materials of the opposite plates of the cell should be such that the difference of alignment of molecules adjacent to one plate with respect to molecules adjacent to the opposite plate is about $\pi/2$ when the characteristic pitch Po of the chiral nematic host material is approximately 4 times the thickness d of the layer of the guest-host mixure, $\pi$ when this characteristic pitch is Po≃2d, and $2\pi$ or 0 when Po≃d. In terms of a formula, if as shown in FIG. 4 the attitude of the long axes of molecules adjacent to one plate A with respect to a reference axis, say the X axis, is $\psi 1$ and the attitude with respect to the long axes of the liquid crystal molecules adjacent to the opposite plate B is $\psi 2$, then the absolute value of the difference $\Delta\psi$ between $\psi 1$ and $\psi 2$ should be $$\Delta\psi = 2\pi d/Po \qquad (1)$$

This condition is important not only with respect to ensuring improvement of response but also with respect to ensuring good alignment without disclination of the liquid crystal molecules of a display cell and hence good quality of colour when a display is given. In some cases the light for illuminating a display cell which makes use of guest-host interactions in a chiral nematic liquid crystal solution may be natural light, but in most cases the light should be light which is polarized in such a manner that the electric vector of light which has passed through a polarizer is parallel to the planes of alignment of the long axes of the liquid crystal molecules adjacent to the plate on which the light is incident.

Figure 9:
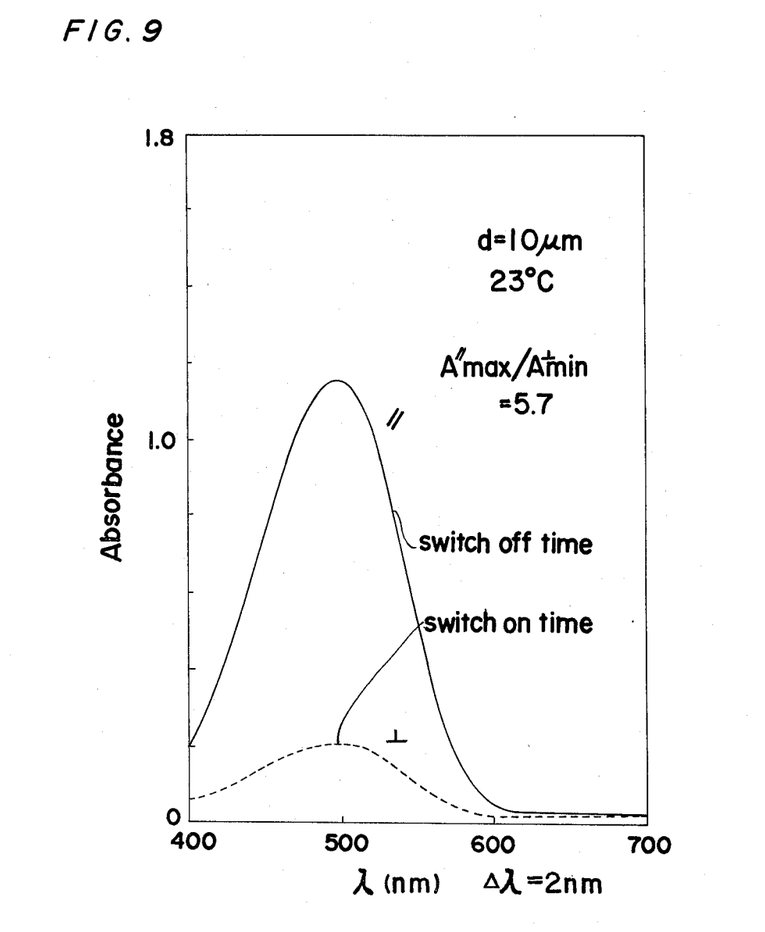
FIG. 9 is a graph of the dichroic spectrum of the display of a specific example of the invention.

Considering now the other object of the invention which is to provide a guest-host mixture colour display means having improved contrast, since contrast in such a means is dependent on the thickness of the guest-host mixture constituting the dielectric, the contrast ratio thereof is most conveniently evaluated in terms of the absorbance, or dichroic ratio $A''\text{max}/A'\text{max}$, which in any one guest-host mixture remains generally the same irrespective of the thickness of the layer constituted by the mixture, $A''\text{max}$ being the absorbance for the light wavelength at which absorption of light by the guest-host mixture layer is maximum, i.e., the maximum value on the absorption spectrum of the guest-host mixture, when the long axes of the molecules of the mixture are aligned parallel to the electric vector of the incident polarized light, and $A'\text{max}$ being the maximum value on the absorption spectrum of the guest-host mixture when the long axes of the molecules of the guest-host mixture layer are perpendicular to the electric vector of the incident polarized light. Needless to say, the greater the dichroic ratio $A''\text{max}/A'\text{max}$, the better the contrast achieved in a guest-host mixture display means. The dichroic ratio of the dye for example, is approximately 5.7, and the dichroic spectra thereof are as shown in FIG. 9. The dichroic ratio of such dye material constituting the guest material in a guest-host mixture may be taken to be infinite compared with that of the host material. Thus, assuming that dye molecules are effectively aligned with liquid crystal molecules in a guest-host mixture, it is found that the dichroic ratio of the mixture as a whole is related to the order parameter S of the host liquid crystals as follows.

$$A''\text{max}/A'\text{max} = (1+2S)/(1-S) \qquad (2)$$

From Formula (2) it is seen that in order to increase the ratio $A''\text{max}/A'\text{max}$ the order parameter S of the liquid crystals should be as close as possible to 1.

Figure 6:
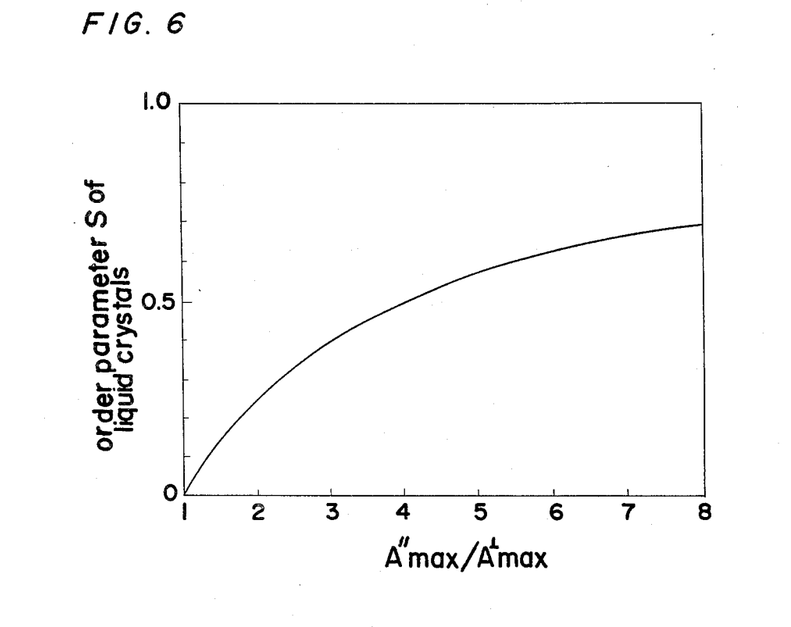
FIG. 6 is a graph showing the relationship between degree of order and the dichroic ratio in nematic liquid crystals.

Employing Formula (2) the relationship of $A''\text{max}/A'\text{max}$ and S is plotted in FIG. 6, from which is it apparent that $A''\text{max}/A'\text{max}$ increases steadily, although at a decreasing rate, with increasing S. The inventors therefore undertook research to determine a method for producing host material in which the order parameter S is requisitely high, while maintaining the advantage of good switching response noted above.

Part of the research consisted of determining the effect which the number of carbon atoms m in the terminal groups of the molecules of liquid crystals has on the order parameter S of the liquid crystals, it being known that the order parameter S of liquid crystals is governed by interactions of molecules and that when the central groups of molecules are fixed the number of carbon atoms m of the alkyl portions of terminal groups thereof may be even or odd. It was found that an odd number of carbon atoms in terminal groups resulted in a low order parameter S and an even number of carbon atoms m resulted in a higher order parameter S. This is illustrated in FIG. 7, which plots values of order parameter S against values of the number of carbon atoms m in the terminal groups of molecules of different samples of nematic liquid crystals having the general formula $n-C_m$

Figure 7:
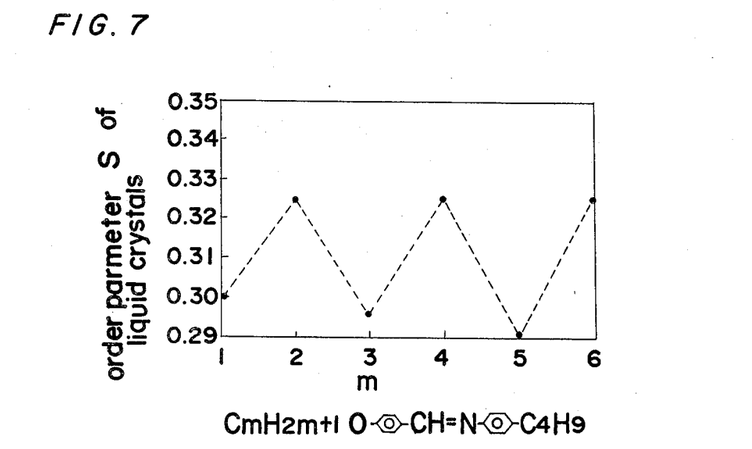
FIG. 7 is a graph showing the relationship between degree of order of nematic liquid crystals and number of carbon atoms in terminal groups of molecules constituting the crystals.

From FIG. 7 it is seen that when the number of carbon atoms m is 5, for example, the order parameter S is approximately 0.29, whereas when the number of carbon atom m is 6 the order parameter S is much higher at 0.33. These order parameters $S_s$ are obtained at the clearing transition point of a nematic liquid crystal system.

Figure 5:
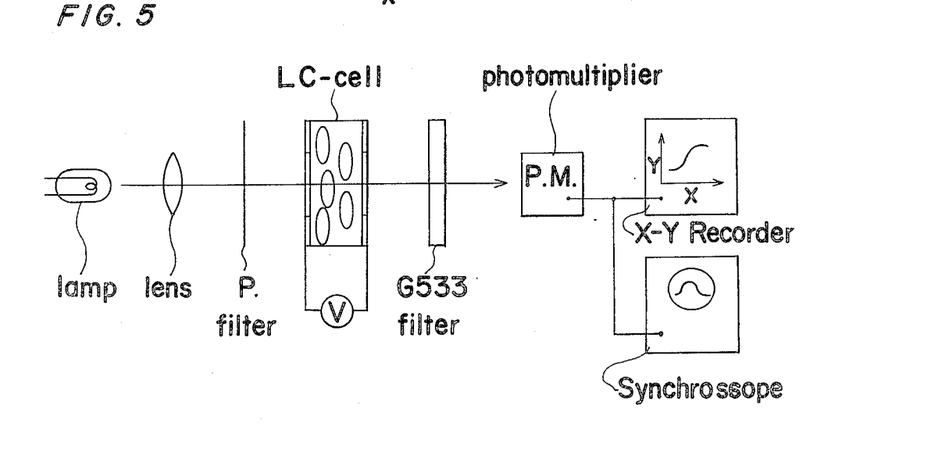
FIG. 5 is a schematic layout view of equipment employed for determining the contrast achievable with a display means according to the invention.

Referring to FIG. 5, to determine the dichroic ratios of these samples, each sample was employed as the dielectric layer in a cell connectable to a voltage source V, and in each case light was directed from a lamp, through a lens and polarizer, through the cell, through a band-pass filter G533, which passes only light of wavelength in the absorption region, to a photomultiplier PM, whose output was supplied to an X-Y recorder and to a synchroscope. Measurements made with this equipment showed that the dichroic ratio of liquid crystals when the number of carbon atoms m is 6 is some 11% higher than when the number of carbon atoms m is 5. It was therefore concluded that by use of host material whose molecules have an even number of carbon atoms in the alkyl portions of the terminal groups thereof and have a characteristic pitch Po such as noted above there could be obtained a guest-host interaction display means which provides improved contrast as well as faster switching response. It was also presumed, and shown to be correct by subsequent tests, that the same results may be achieved if the host material consists of a mixture of different nematic liquid crystals whose molecules have an even number of carbon atoms in the terminal groups thereof. Non-limiting examples of such host material mixtures which may be employed in a display means according to the invention are a mixture of Further, it was found that although it is preferable that all the components of a host material mixture have molecules with even numbers of carbon atoms in the terminal groups thereof, this is not an essential condition and that a comparatively high order parameter is also achievable in host material mixtures in which some of the components have molecules with an odd number of carbon atoms in the terminal groups thereof. In such a mixture, however, it was found by experiment that a condition for achievement of a suitably high order parameter, and hence a suitably high dichroic ratio, is that the components whose molecules have even numbers of carbon atoms in the terminal groups thereof constitute at least 60% by weight of the mixture. An example of such a mixture is When the latter component constitutes 60% or more by weight of the mixture, a requisitely high order parameter is achieved, in addition to which the mixture is in a nematic phase within a comparatively wide temperature range of from −30° C. to +60° C.

Thus, according to the invention it is possible to employ a wide range of materials to achieve improved colour switching response and contrast in a guest-host mixture colour display means. Broadly, these improvements are achieved by employment of dye material in host material consisting of a nematic phase, a cholesteric phase and a smectic phase, it being particularly advantageous to employ liquid crystals in which the terminal groups of molecules are constituted by hydrocarbon groups having even numbers of carbon atoms.

Figure 10:
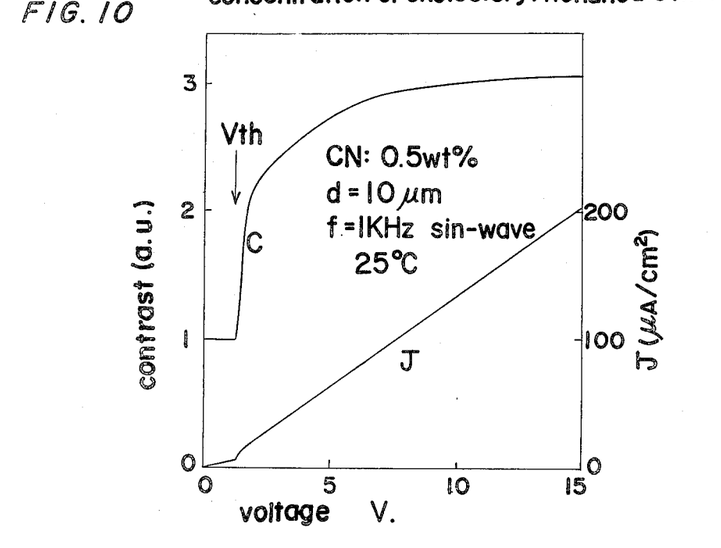
FIG. 10 is a graph showing the relationship between contrast and applied voltage in a display means according to the invention.
Figure 11:
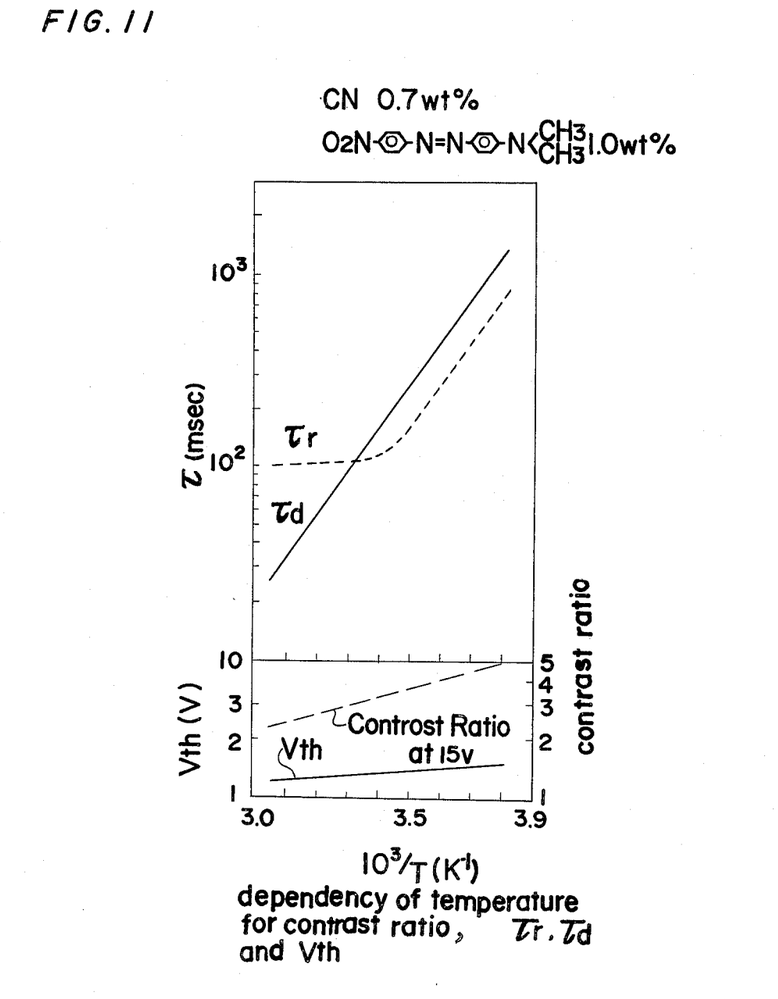
FIG. 11 is a graph of temperature-dependence of values of response, contrast, and threshold voltage in a display means according to the invention.

Reference is now had to FIGS. 9 through 11 which show the improved results achieved with one embodiment of the invention. There was prepared a plurality of display cells such as shown in FIG. 1 in which the dielectric layer was constituted by guest-host mixture having the composition indicated in Table 2.

TABLE 2

| Host |
| --- |
| $C_5H_{11}$—⟨O⟩—⟨O⟩—CN |
| $C_5H_{11}O$—⟨O⟩—⟨O⟩—CN |
| $C_7H_{15}O$—⟨O⟩—⟨O⟩—CN |
| $C_8H_{17}O$—⟨O⟩—⟨O⟩—CN |
| Guest |
| $O_2N$—⟨O⟩—N=N—⟨O⟩—N(CH$_3$)$_2$ |
| (4-p-nitro p'-dimethyl amino azobenzene) |

Optically active additive
  Cholesteryl nonanoate

In all dielectrics the proportion of the guest material, whose dichroic spectra are shown in FIG. 9 referred to above, was 1.0% by weight, and the thickness of the active area of the dielectric layer in each cell was 10 μm. Additions of various amounts of cholesteryl nonanoate as an optically active dopant were made to the different samples.

Figure 8:
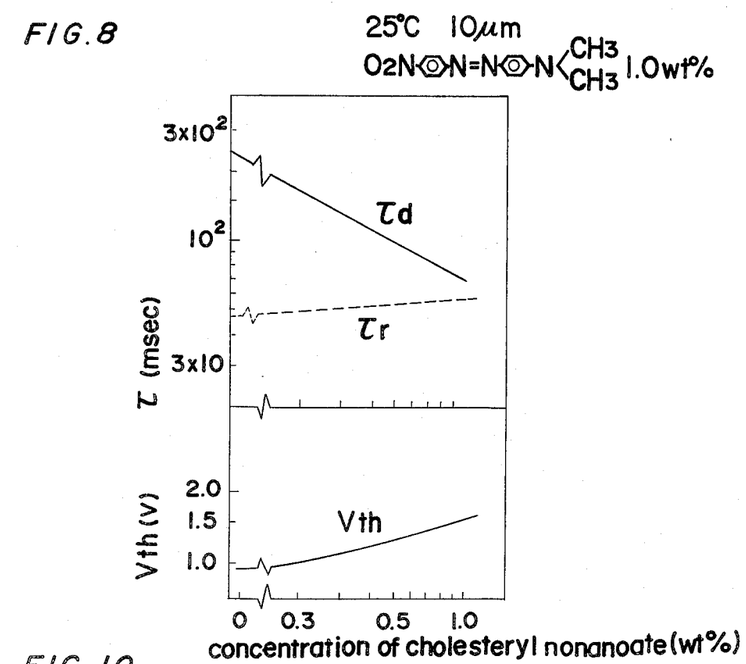
FIG. 8 is a graph of display means response and threshold voltage against optical active dopant concentration in a display means according to the invention.

In FIG. 8 it is seen that as the amount of added cholesteryl nonanoate is increased from about 0.3% by weight to about 1.0% by weight there is a slight increase in the threshold value of voltage required to actuate the display cell, and switch-off time $T_d$ decreases rapidly from a comparatively high value to well below 100 msec, while there is only a slight increase in switch-on time $T_r$.

To give optimum overall response in this guest-host mixture, therefore, the amount of added cholesteryl nonanoate is suitably of the order of 1% by weight.

FIG. 10 shows the contrast achieved by a guest-host mixture containing a 0.5% by weight addition of cholesteryl nonanoate when ambient temperature is 25° C. and there is employed a sinusoidal AC source having a frequency of 1 KHz to actuate a cell. As actuating voltage is increased current through the cell increases steadily and contrast increases rapidly to a high value comparable to that of the dye material alone.

In FIG. 11, in which the abscissa is the reciprocal of temperature measured in kelvins times $10^3$, it is seen that threshold voltage Vth increases slightly as temperature falls, and that both switch-on time $T_r$ and switch-off time $T_d$ increase quite rapidly as temperature decrease below about 0° C. Contrast, however, is good over the complete range from about $-20°$ C. to $+60°$ C., and actually improves as temperature decreases.

In addition thereto, further changes and modifications will become apparent to those skilled in the art upon the reading of the description of the present invention with or without reference to the accompanying drawings. Therefore, these changes and modifications are to be construed as being included within the true scope of the present invention.

What is claimed is:

1. A liquid crystal display system comprising:
   two electrodes at least one of which is transparent, said two electrodes being disposed on substrates, respectively;
   an electric source connected between the electrodes for applying an electric field therebetween;
   a pleochroic dye guest material;
   a nematic liquid crystal containing an optically active dopant to form a chiral nematic liquid crystal host material wherein the helical axes thereof are aligned perpendicular to the planes of said electrodes in the non-activated state in the absence of an electric field by said electric source and the value of the characteristic pitch of said chiral nematic liquid crystal host material is selected to be from 0.7 to 10 times the thickness of a layer of solution of the dye material and the liquid crystal host material, the difference of relative attitude $\Delta\psi$ between the orientation of the long axes of molecules adjacent one electrode and the orientation of the long axes of molecules adjacent the other electrode of the liquid crystal host material being approximately $\Delta\psi = 2\pi d/P_o$, wherein d is the thickness of the solution lying between the electrodes and Po is the characteristic pitch of the liquid crystal host material, at least a portion of said nematic liquid crystal has the formula wherein X and Y are terminal groups and Z is a bridging group; wherein at least one of said terminal groups contains an alkyl portion including a straight-chain saturated hydrocarbon portion having an even number of carbon atoms which constitutes at least 60% by weight of said liquid crystals; and
   a polarizer provided on one of the substrates, thereby providing polarized light, the electric vector of which is parallel to the direction of the long axes of the molecules of said liquid crystal host material adjacent to the electrode on which said polarized light is incident.

2. The liquid crystal display system according to claim 1, wherein the relative attitude $\Delta\psi$ is approximately $(\pi/2)$.

3. The liquid crystal display system according to claim 1, wherein the relative attitude $\Delta\psi$ is approximately $\pi$.

4. The liquid crystal display system according to claim 1, wherein the relative attitude $\Delta\psi$ is approximately $2\pi$.

* * * * *